(12) United States Patent
Yamazaki et al.

(10) Patent No.: US 6,735,512 B2
(45) Date of Patent: May 11, 2004

(54) POWER STABILIZING UNIT

(75) Inventors: Shigeru Yamazaki, Odawara (JP); Hirokazu Hirosawa, Odawara (JP)

(73) Assignee: Mikuni Corporation, Tokyo (JP)

( * ) Notice: Subject to any disclaimer, the term of this patent is extended or adjusted under 35 U.S.C. 154(b) by 0 days.

(21) Appl. No.: 10/158,073

(22) Filed: May 31, 2002

(65) Prior Publication Data

US 2003/0225502 A1 Dec. 4, 2003

(51) Int. Cl.[7] ............................................. G06F 19/00
(52) U.S. Cl. ........................ 701/102; 323/288; 701/105
(58) Field of Search ................................ 701/102, 105; 323/288

(56) References Cited

U.S. PATENT DOCUMENTS

| | | | |
|---|---|---|---|
| 5,816,221 A | | 10/1998 | Krueger ........................ 123/491 |
| 5,931,245 A | * | 8/1999 | Uetake et al. ............. 180/65.8 |
| 5,949,190 A | * | 9/1999 | Notsu ........................... 315/76 |

FOREIGN PATENT DOCUMENTS

| | | |
|---|---|---|
| EP | 0646723 A1 | 4/1995 |
| JP | 8-9393 | 3/1996 |

* cited by examiner

*Primary Examiner*—John Kwon
(74) *Attorney, Agent, or Firm*—Harness, Dickey & Pierce, P.L.C.

(57) ABSTRACT

A power supply unit for an internal combustion engine capable of more stably providing drive power to a control circuit of the internal combustion engine and capable of more rapidly starting up the control circuit. The power supply unit may include a generator for generating electrical power, a main power supply circuit for regulating drive power, a capacitor for storing electrical power supplied by the main power supply circuit, a current control circuit for supplying electrical power to the control circuit other than the capacitor and various loads when the voltage output by the main power supply circuit is less than a first voltage, and supplying electrical power to the capacitor when the voltage output by the main power supply circuit is greater than or equal to the first voltage, and a discharge circuit for supplying electrical power accumulated at the capacitor to the control circuit and the various loads when the output voltage of the main power supply circuit falls to a voltage equal to or less than the capacitor voltage.

20 Claims, 8 Drawing Sheets

POWER STABILIZING UNIT

TECHNICAL FIELD

The present invention relates to a power stabilizing unit and more particularly relates to a power stabilizing unit for use in an internal combustion engine.

RELATED ART

In conventional batteryless internal combustion engines, a crankshaft is forcibly rotated using a kick lever or a starting rope to rotate a generator (ACG) coupled to the crankshaft so that generated drive power is used to drive control circuits etc. for an internal combustion engine mounted on a vehicle, such as a motorcycle, snowmobile, etc.

In such conventional batteryless internal combustion engines, insufficient power may be generated by the kicking action, an output of the main power supply circuit (regulator rectifier) may be intermittent, and spike-shaped drops may occur in the power supply voltage due to the output power of the ACG being temporarily insufficient due to large rush currents when a lamp load is switched on or various other loads, such as pulse-shaped currents of an injector, igniter, etc. A particularly dramatic drop occurs in the power supply voltage when an inrush current, occurring when the turn indicator lamps are switched on, overlaps with injector or ignition coil driving.

This drop is particularly large and may cause the engine to stop when the drop in the power supply voltage falls below a minimum operating voltage of the engine control unit. Even if the engine does not stop, dramatic fluctuations in the power supply voltage may be detrimental to the discharge precision of the injector and may cause the ignition voltage to be insufficient.

One solution for compensating for power supply voltage fluctuations is to provide a power stabilizing circuit including a diode and a capacitor between the generator and the control circuit. Such a power stabilizing circuit is described, for example, in Japanese Examined Utility Model Application Publication No. Hei. 8-9393). However, in the above publication, the power supply voltage of the control circuit is stabilized by connecting an injector load to the output of the main power supply circuit, connecting the control circuit power supply via a diode, and providing a capacitor at this location. However, deterioration of injector discharge reliability is unavoidable because the injector power supply voltage is not stable.

Another proposed solution is to make the capacitance of the capacitor large. Unfortunately, it takes time for the power supply voltage of the power supply circuit to rise in order to charge the capacitor when kick-starting with this kind of batteryless system.

Specifically, engine rotation due to kick-starting takes place for approximately 0.2 to 0.4 seconds. During this time, the time required for activation of the injection system becomes substantially shortened due to charging of the capacitor and in the worst case, the supply of power is stopped prior to the injection system reaching the start-up power supply voltage.

SUMMARY OF THE INVENTION

The present invention provides a power stabilizing unit for an internal combustion engine capable of stably providing drive power to a control circuit of the internal combustion engine and capable of rapidly starting up the control circuit.

In at least one embodiment, the present invention is directed to a power stabilizing unit for supplying drive power to at least one control circuit for controlling an internal combustion engine and at least one other load, comprising a main power supply circuit for regulating drive power, a capacitor, connected to the main power supply circuit, for storing electrical power supplied by the main power supply circuit, a current control circuit for supplying electrical power, supplied by the main power supply circuit, to the at least one control circuit and/or said at least one other load but not to the capacitor when a voltage outputted by the main power supply circuit is less than a first set voltage, and supplying electrical power from the main power supply circuit to the capacitor when the voltage outputted by the main power supply circuit is greater than or equal to the first voltage, and a discharge circuit for supplying electrical power accumulated in the capacitor to said at least one control circuit and/or the at least one other load when the output voltage of the main power supply circuit falls to a voltage equal to or less than the capacitor voltage.

In at least one embodiment, the present invention is directed to a power stabilizing unit further comprising a short circuiting circuit including a switching element provided across said capacitor and said main power supply circuit such that said capacitor and said main power supply circuit are short-circuited by putting the switching element on when a voltage outputted from said main power supply circuit becomes greater than or equal to a second voltage.

In at least one embodiment, the present invention is directed to a power stabilizing unit, wherein the path of the short circuit is controlled by a microcomputer.

In at least one embodiment, the present invention is directed to a power stabilizing unit, wherein the switching element is a relay.

In at least one embodiment, the present invention is directed to a power stabilizing unit, wherein the switching element is an FET.

In at least one embodiment, the present invention is directed to a power stabilizing unit, wherein the switching element is capable of holding an on state using a self-holding function.

In at least one embodiment, the present invention is directed to a power stabilizing unit, wherein the switching element is capable of releasing the self-holding function by turning a main switch, used in starting and stopping the internal combustion engine, off.

In at least one embodiment, the present invention is directed to a power stabilizing unit for an internal combustion engine, further comprising a diode provided between said main power supply circuit and said voltage detection circuit, so that the at least one other load is connected between the diode and said main power supply circuit.

In at least one embodiment, the present invention is directed to a power stabilizing unit, further comprising a main switch, either connected at an input side of said at least one control circuit, or at an output side of said main power supply circuit.

In at least one embodiment, the present invention is directed to a power stabilizing unit, wherein said power stabilizing unit is part of a power supply unit, wherein said main power supply circuit is connected to a generator for generating electrical power.

In at least one embodiment, the present invention is directed to a power stabilizing unit, wherein said power stabilizing unit is part of a power supply unit, said power supply unit further including a generator for generating electrical power.

In at least one embodiment, the present invention is directed to a power stabilizing unit, wherein said power stabilizing unit is part of a power supply unit, which is further part of an internal combustion engine.

In at least one embodiment, the present invention is directed to a power supply unit for supplying drive power to at least one control circuit for controlling an internal combustion engine and at least one other load, comprising a generator for generating electrical power, a main power supply circuit for regulating drive power, a capacitor, connected to the main power supply circuit, for storing electrical power supplied by the main power supply circuit, a current control circuit for supplying electrical power, supplied by the main power supply circuit, to the at least one control circuit and/or said at least one other load but not to the capacitor when a voltage outputted by the main power supply circuit is less than a first set voltage, and supplying electrical power from the main power supply circuit to the capacitor when the voltage outputted by the main power supply circuit is greater than or equal to the first voltage, and a discharge circuit for supplying electrical power accumulated in the capacitor to said at least one control circuit and/or the at least one other load when the output voltage of the main power supply circuit falls to a voltage equal to or less than the capacitor voltage.

In at least one embodiment, the present invention is directed to an internal combustuion engine, comprising a generator for generating electrical power, a main power supply circuit for regulating drive power, a capacitor, connected to the main power supply circuit, for storing electrical power supplied by the main power supply circuit, a current control circuit for supplying electrical power, supplied by the main power supply circuit, to at least one control circuit and/or at least one other load but not to the capacitor when a voltage outputted by the main power supply circuit is less than a first set voltage, and supplying electrical power from the main power supply circuit to the capacitor when the voltage outputted by the main power supply circuit is greater than or equal to the first voltage, and a discharge circuit for supplying electrical power accumulated in the capacitor to said at least one control circuit and/or the at least one other load when the output voltage of the main power supply circuit falls to a voltage equal to or less than the capacitor voltage.

EXEMPLARY EMBODIMENTS

The following is a description, with reference to the drawings, of exemplary embodiments of the present invention.

Figure 1:
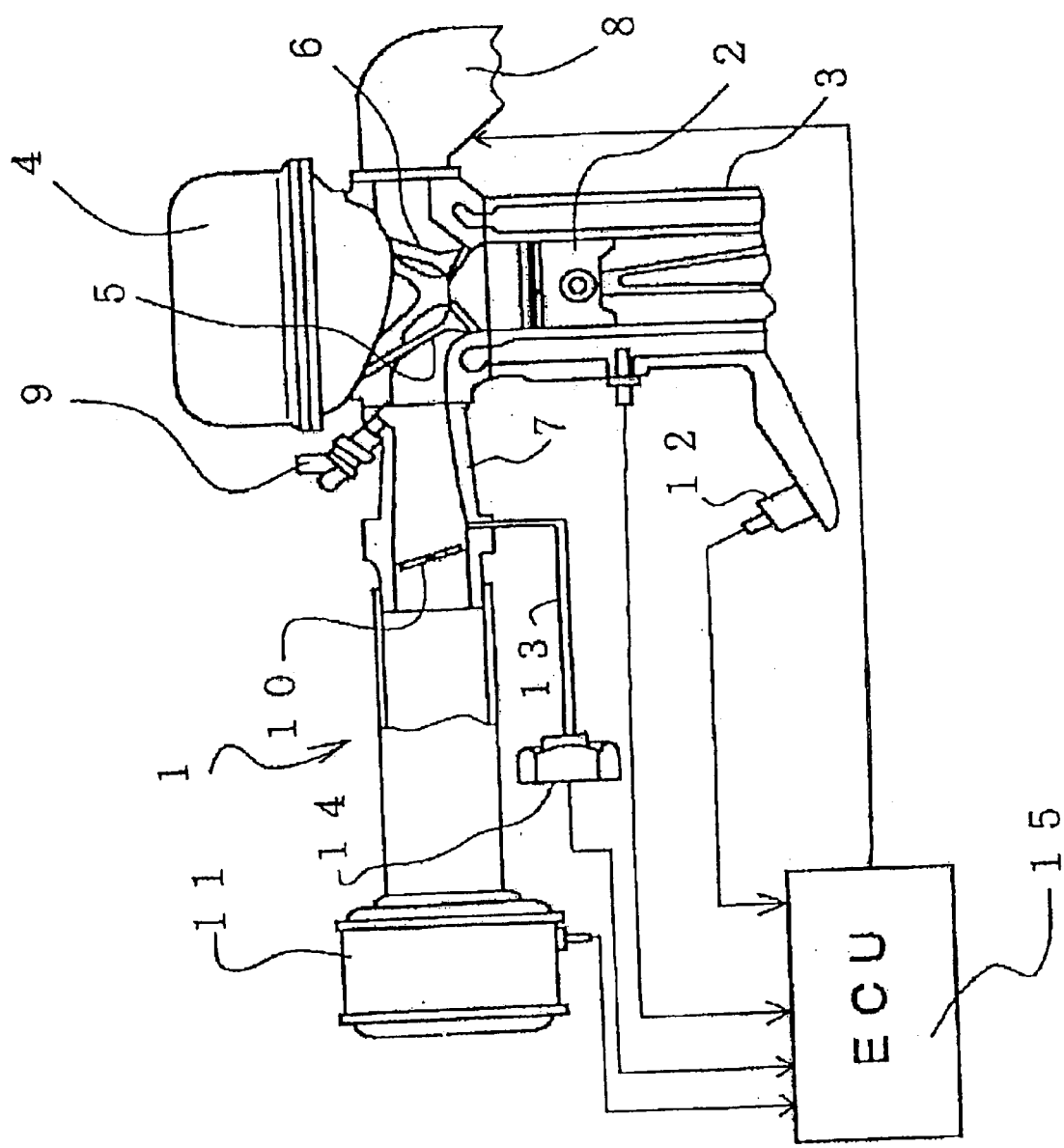
FIG. 1 is a side view outlining an example structure for an internal combustion engine.

FIG. 1 shows an example structure for an internal combustion engine indicated by numeral 1 in the drawing.

The internal combustion engine 1 includes a cylinder block 3 fitted with a free-sliding piston 2, a cylinder head 4 forming a combustion chamber fitted at an upper part of the cylinder block 3, an intake valve 5 and exhaust valve 6 slideably fitted at the cylinder head 4, and an intake pipe 7 and exhaust pipe 8 fitted at the cylinder head 4.

An injector 9 for injecting fuel is also provided at the intake pipe 7. A throttle valve 10 for regulating intake is then provided upstream from the portion where the injector is provided, within the intake pipe 7. An air cleaner 11 for purifying intake air is then fitted at an end of the intake pipe 7 on the upstream side of the intake pipe 7.

Further, numeral 12 is a crank angle sensor for detecting the rotational position and rotational speed of the crankshaft.

A pressure sensor 14 is fitted to the intake pipe 7 via a lead pipe 13, with intake then being measured by detecting intake pressure within the intake pipe 7.

Numeral 15 indicates an engine control unit (ECU) used as a control circuit for controlling driving of the internal combustion engine 1. Drive power is supplied to the control unit 15 by a power supply unit 16 described below.

Figure 2:
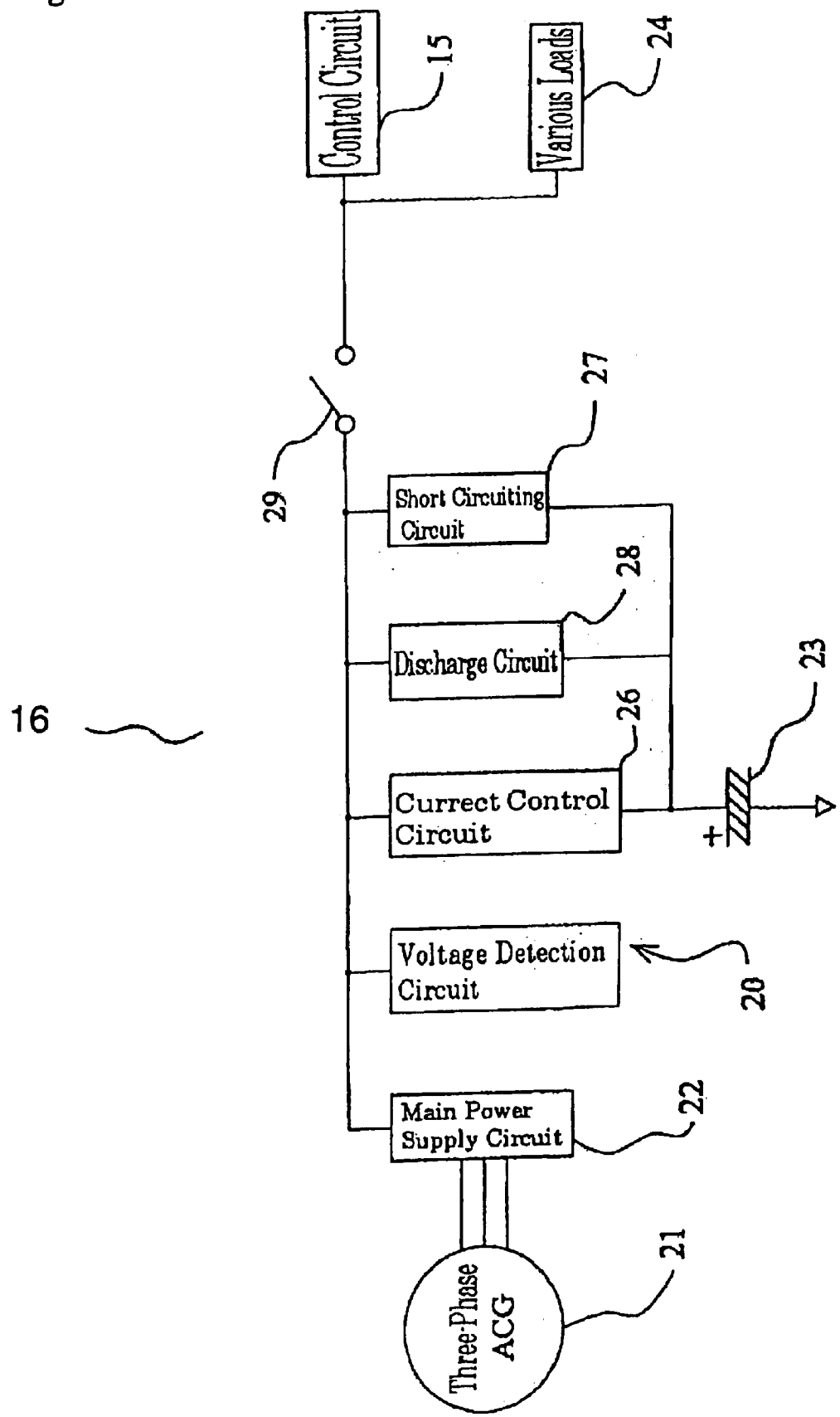
FIG. 2 is a view showing the system configuration for an exemplary embodiment of the present invention.

As shown in FIG. 2, the power supply unit 16, in one exemplary embodiment, includes a generator 21 for generating electrical power, a main power supply circuit 22 connected to the generator 21 (in an exemplary embodiment, constituted by a regulator actuator) for regulating drive power, a capacitor 23, connected to the main power supply circuit 22, for storing electrical power supplied by the main power supply circuit 22, a current control circuit 26 for supplying electrical power supplied by the main power supply circuit 22 to the control circuit 15 other than the capacitor 23 and various loads 24 when the voltage outputted by the main power supply circuit 22 is less than a first voltage (V1), and supplying electrical power from the main power supply circuit 22 to the capacitor 23 when the voltage outputted by the main power supply circuit 22 is greater than or equal to the first voltage (V1), and a discharge circuit 28 for supplying electrical power accumulated at the capacitor 23 to the control circuit 15 and the various loads 24 when the output voltage of the main power supply circuit 22 falls to a voltage equal to or less than a voltage of the capacitor 23.

A short circuiting circuit 27 having a switching element is provided across the capacitor 23 and the main power supply circuit 22 in such a manner that the capacitor 23 and the main power supply circuit 22 are short-circuited by putting the switching element on when a voltage outputted from the main power supply circuit 22 becomes greater than or equal to a second voltage (V2).

Numeral 29 in FIG. 2 indicates a main switch for making and breaking the electrical connection between the main power supply circuit 22 and the control circuit 15 and various loads 24.

In an exemplary embodiment of the present invention, the various loads 24 may include electrical loads such as a fuel pump, injector, headlights, etc.

Figure 3:
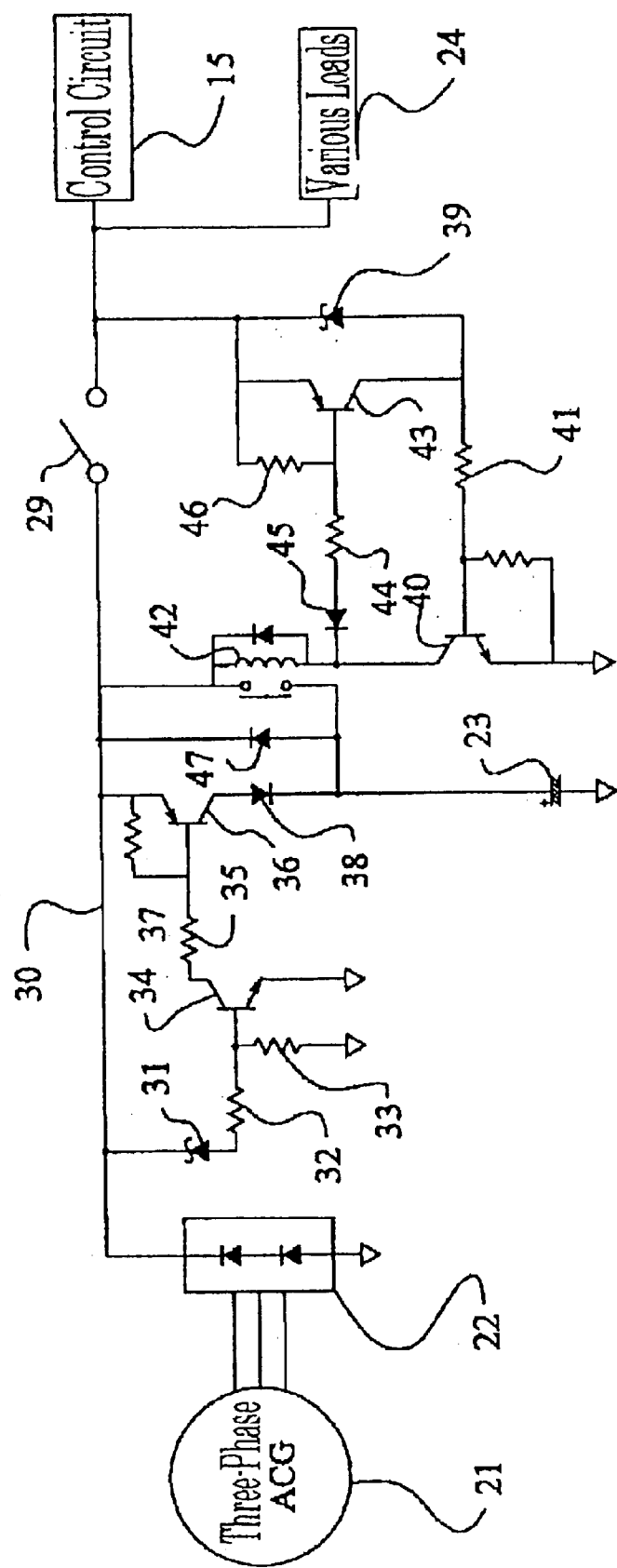
FIG. 3 is a circuit diagram showing the exemplary embodiment of FIG. 2 of the present invention.

With reference to FIG. 3, the main power supply circuit 22, control circuit 15 and various loads 24 are electrically connected by a main power line 30, with the main switch 29 being provided midway along the main power line 30.

Zener diodes 31 are connected to the main power line 30, and the zener diodes 31 are connected to the base of an npn transistor 34 via resistors 32 and 33.

A base electrode of a pnp transistor 36 is connected via a resistor 35 to the collector of the transistor 34. The emitter of a transistor 36 is then connected to the main power line 30 and to the base side via a resistor 37.

The capacitor 23 is then connected to the collector of the transistor 36 via the diode 38.

In this exemplary embodiment, the breakdown voltage of the zener diodes 31 is set to 10V and is the first voltage V1 referred to above.

The transistors 34 and 36 go on when the voltage outputted by the main power supply circuit 22 exceeds 10V and the capacitor 23 is electrically connected to the main power line 30.

In this exemplary embodiment, the zener diodes 31 constitute a voltage detecting circuit for deciding upon the starting and stopping of charging of the capacitor 23 and the current control circuit 26 is constituted by the transistors 34 and 36 and the diode 38.

On the other hand, a zener diode 39 set to a breakdown voltage of 12V is connected between the main switch 29 and the control circuit 15 of the main power line 30, with this breakdown voltage being the second voltage V2.

The base of an npn transistor 40 is connected to the zener diode 39 via a resistor 41, with the transistor 40 being on when the output voltage from the main power supply circuit 22 exceeds the second voltage V2.

A coil of a relay 42 constituting a switching element is connected to the collector of the transistor 40 and the collector of the transistor 40 is electrically connected to the main power line 30 via the coil.

The relay 42 is driven by the transistor 40 and electrically connects and disconnects the main power line 30 and the capacitor 23.

The capacitor 23 is therefore electrically connected (short-circuited) to the main power line 30 as a result of the relay 42 going on when the voltage outputted by the main power supply circuit 22 is a voltage that puts the transistor 40 on, i.e. a voltage exceeding the second voltage V2. The zener diode 39, transistor 40 and relay 42 constitute the short circuiting circuit 27 of this exemplary embodiment.

A pnp transistor 43 is provided in parallel with the zener diode 39. The base of the transistor 43 is connected to the collector of the transistor 40 via a resistor 44 and a diode 45 and is connected to the emitter via a resistor 46.

A voltage is applied to the base of the transistor 43 as a result of transistor 40 being on and the transistor 43 therefore also goes on. As a result, the main power line 30 and the base of the transistor 40 are connected so that the zener diode 39 is bypassed.

Once the transistor 40 goes on, the transistor 40 maintains this on state and the relay 42 also remains on so as to furnish the short circuiting circuit 27 with a self-holding function.

On the other hand, a diode 47 is provided in parallel with the relay 42 between the main power line 30 and the capacitor 23 and electrical power is supplied to the main power line 30 from the capacitor 23.

By forming the circuit in this manner, when the main switch 29 goes on again after going off, power stored in the capacitor 23 is supplied to the control circuit 15 even if the relay 42 is off.

The diode 47 therefore performs the function of the discharge circuit 28 in this exemplary embodiment.

Next, a description of the operation of the power supply unit 16 of this exemplary embodiment constructed in this manner, is provided.

First, when the main switch 29 is closed and the generator 21 is forcibly rotated, power generated by the generator 21 is regulated by the main power supply circuit 22 and supplied to the control circuit 15 and the various loads 24.

The voltage outputted by the main power supply circuit 22 gradually rises but the transistor 34 maintains an off state until the first voltage constituting the breakdown voltage of the zener diode 31 (constituting an exemplary voltage detection circuit 20) is reached and the capacitor 23 therefore remains separated from the main power line 30.

Figure 4:
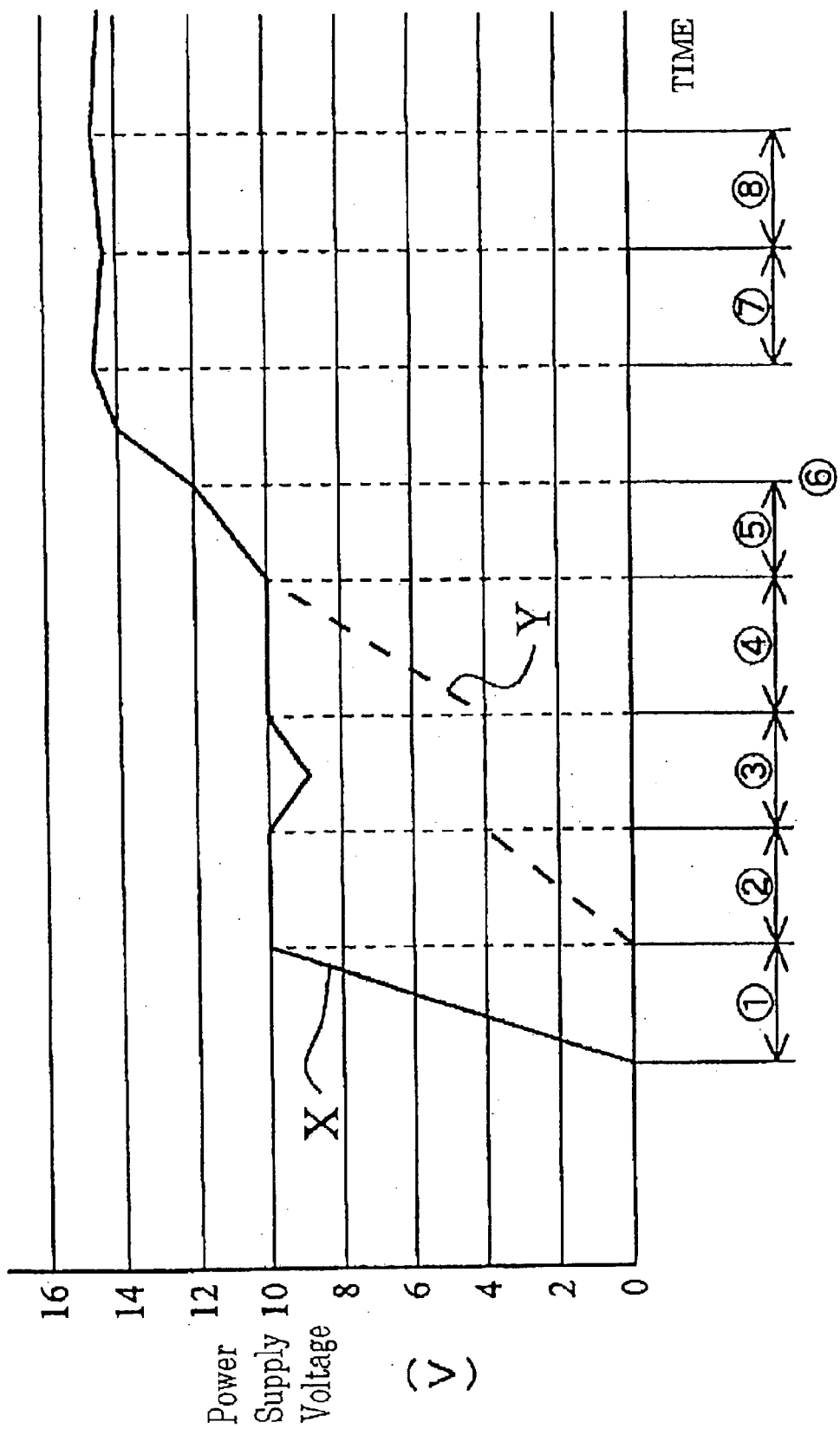
FIG. 4 is a view showing a voltage waveform of the exemplary embodiment of FIG. 2 of the present invention.

In this way, power outputted from the main power supply circuit 22 is all supplied to the control circuit 15 and the various loads 24 via the main switch 29 without being stored at the capacitor 23 and the voltage outputted by the main power supply circuit 22 therefore rapidly rises up to the first voltage (10V) as shown by the X portion of the curve in FIG. 4.

The control circuit 15 and the various loads 24 can therefore be made to operate quickly by setting the first voltage V1 to a voltage necessary for causing the control circuit 15 and the various loads 24 to operate, and control of rapid starting of the internal combustion engine 1 is possible with prompt and reliable control of the internal combustion engine 1.

When the voltage outputted by the main power supply circuit 22 reaches the first voltage V1, a voltage is applied to the base of the transistor 34 via the zener diode 31, the transistor 34 and the transistor 36 connected to the transistor 34 go on, and the capacitor 23 is electrically connected to the main power supply line 30.

At this time, charging of the capacitor 23 commences as shown by the Y portion of the curve in FIG. 4.

Namely, charging of the capacitor 23 starts when there is surplus power after guaranteeing the power necessary for driving the control circuit 15.

For example, when the voltage outputted by the main power supply circuit 22 falls below the first voltage V1 (10V) as shown by region 3 in FIG. 4 due to the consumption of power at the various loads 24, the voltage applied to the base of the transistor 34 is no longer present and the transistors 34 and 36 both go off. This ensures a voltage for enabling the control circuit 15 and various loads 24 to operate again for when the charging of the capacitor 23 is halted.

Maintaining the drive power provided to the control circuit 15 and the various loads 24 is therefore given priority and starting of the internal combustion engine 1 can therefore be carried out reliably.

The internal combustion engine 1 then starts and the capacitor 23 is charged so that when the capacitor 23 charges up to the point that the first voltage V1 (10V) is reached, the drive voltage outputted by the main power supply circuit 22 applied to the control circuit 15 and the various loads 24 increases gradually as shown in region 5 of FIG. 4, passes through the second voltage V2, and stabilizes in the vicinity of 14V constituting the control voltage outputted by the main power supply circuit 22.

When the drive voltage reaches the second voltage V2 (12V), the zener diode 39 goes on, the transistor 40 goes on, and the relay 42 therefore also goes on.

The capacitor 23 is therefore electrically connected to the main power line 30.

At the same time, the transistor 40 controlling the operation of the relay 42 also holds an on state due to the transistor 43 being on.

When the various loads 24 operate after the internal combustion engine 1 starts and charging of the capacitor 23 is complete, the drive voltage from the main power supply circuit 22 falls to the extent of the power consumed by these loads. However, as described above, as a result of the capacitor 23 being connected to the main power line 30, when the drive voltage falls, power is supplied from the capacitor 23 so as to replenish the portion by which the drive voltage has dropped.

The capacitor 23 therefore functions as a stabilizing power supply for the drive voltage that stabilizes the drive voltage supplied to the control circuit 15 and the various loads 24.

On the other hand, for example, after the main switch 29 is turned off and the internal combustion engine 1 is stopped, the main switch 29 is turned on in order to restart the internal combustion engine 1.

In this state, the generator 21 is not operating so the zener diode 39 is therefore off, and the relay 42 is kept off as a result.

However, the capacitor 23 is connected to the main power line 30 via the diode 47, which may constitute the discharge circuit 28. When the internal combustion engine 1 starts to operate again, power stored in the capacitor 23 is supplied to the control circuit 15.

When the internal combustion engine 1 is restarted, drive power is therefore supplied to the control circuit 15 without having to wait for the generator 21 to start up, and smooth starting of the internal combustion engine 1 is assured.

When the various loads 24 are operating when the internal combustion engine 1 is restarted, power supplied from the capacitor 23 is consumed by the various loads 24, and it is assumed that the voltage supplied to the control circuit 15 is a voltage lower than the voltage required for these operations, i.e. lower than the first voltage V1.

In order to avoid this, when the various loads 24 are operating at the time of restarting and the voltage outputted from the capacitor 23 is lower than the first voltage V1, the supply of power to the various loads 24 is stopped, and supply of power to the control unit 15 is given priority. This ensures that the internal combustion engine 1 starts in a reliable manner.

Figure 5:
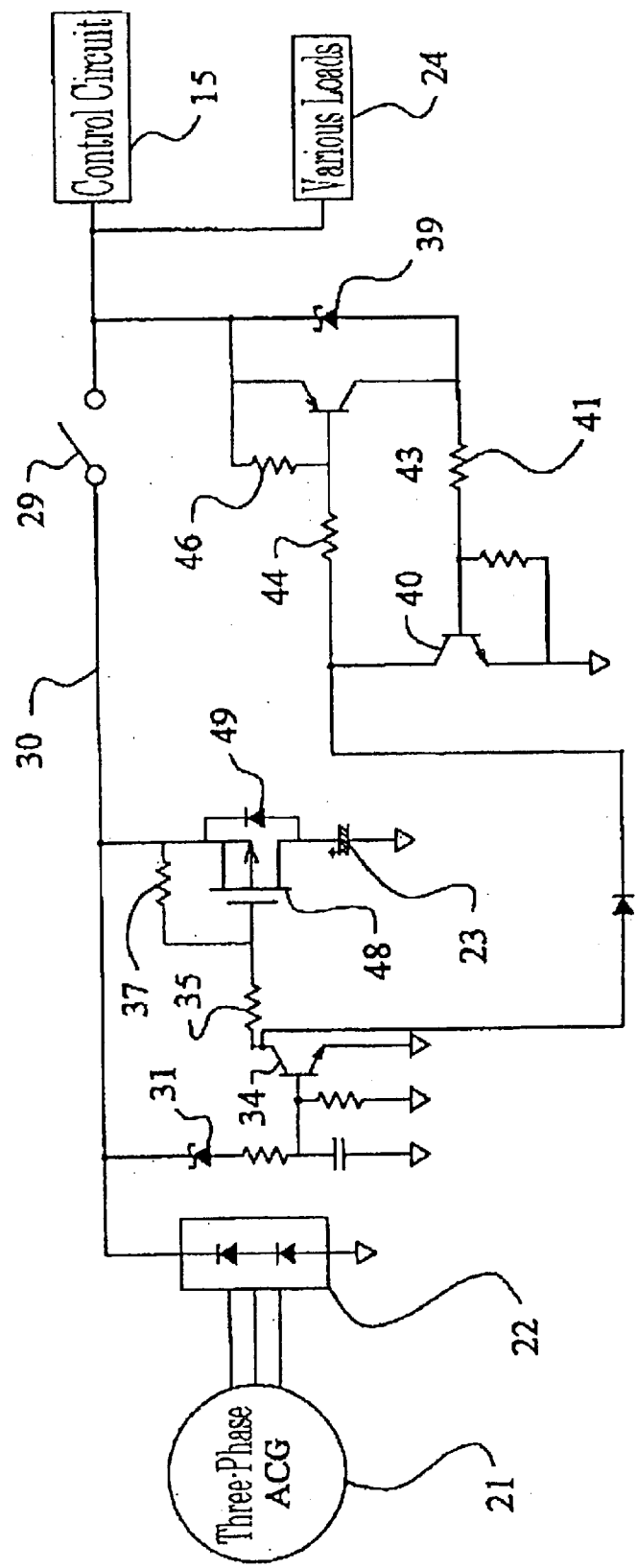
FIG. 5 is a circuit diagram showing another exemplary embodiment of the present invention.

The above embodiment is given as an example, and various modifications are possible based on design requirements, etc. For example, the arrangement of the internal combustion engine 1 of FIG. 1 is exemplary, and any other internal combustion engine arrangement, known to one of ordinary skill in the art, could also be utilized. Similarly, the block diagram and circuit diagrams of FIGS. 2 and 3 are also exemplary and any other block diagram or circuit diagram of a power supply unit, known to one of ordinary skill in the art, could also be utilized. Still further, the circuit elements illustrated in FIG. 3 could also be replaced with equivalent circuit elements, known to one of ordinary skill in the art. For example, as shown in FIG. 5, an FET 48 can be used as the switching element in place of the relay 42.

In the exemplary embodiment of the present invention described above, the power required to drive the switching element 29 can therefore be kept small by using the FET 48. The discharge circuit 28 can also be constructed by providing a diode 49 in parallel with the FET 48 when this FET 48 is used. An FET with a diode built-in may also be used in place of the diode 49.

It may also be desired to reduce the current flowing in the capacitor in order to keep fluctuations in the power supply voltage for the control circuits, injector, and ignition coils as small as possible.

Figure 6:
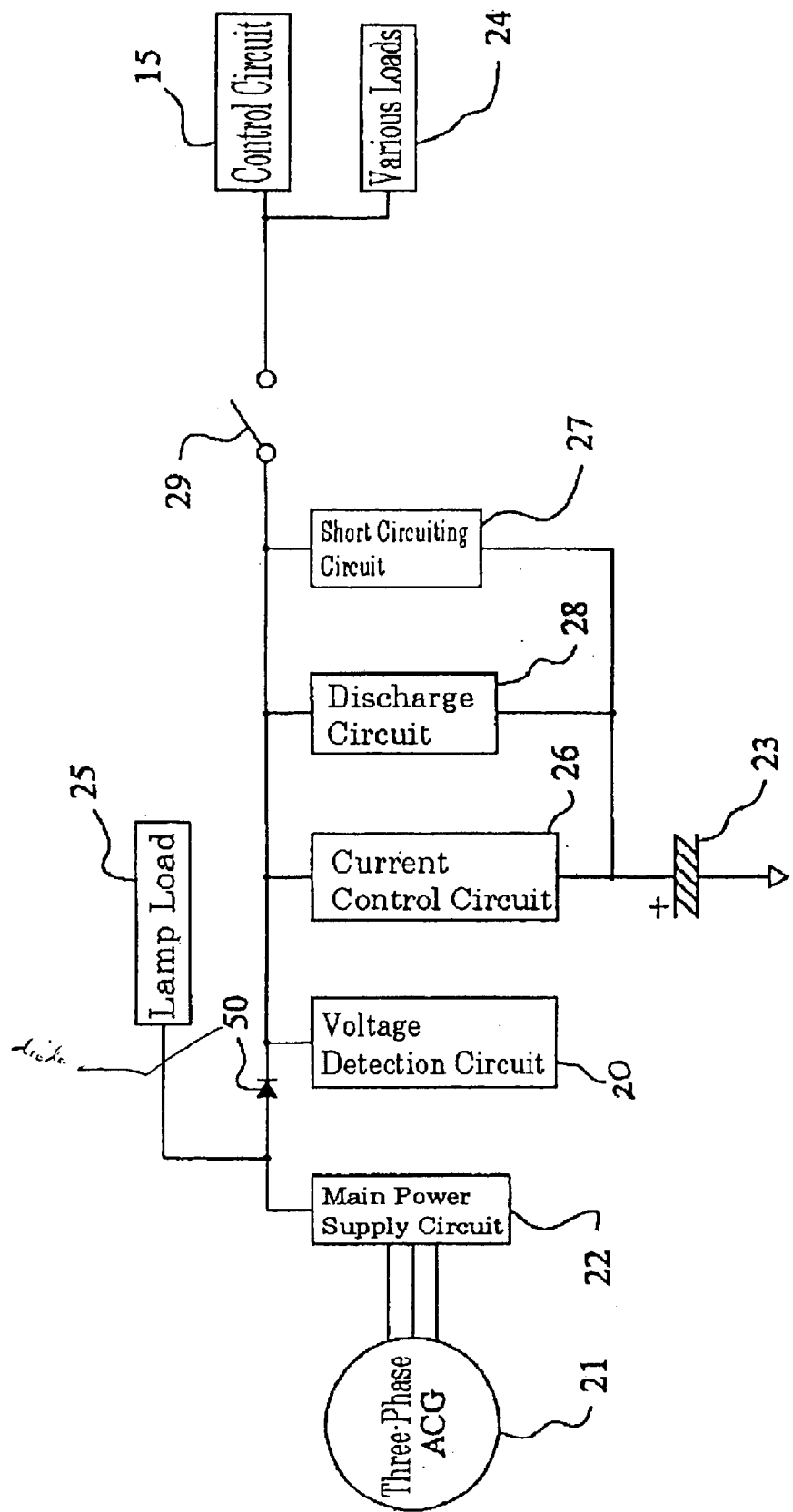
FIG. 6 is a view showing the system configuration for the exemplary embodiment of FIG. 5 of the present invention.

For example, in another exemplary embodiment illustrated in FIG. 6, a diode 50 may be provided between the main power supply circuit 22 and the voltage detection circuit 20, so that a lamp load 25 of each of the various loads 24 is connected between the diode 50 and the main power supply circuit 22.

Figure 7:
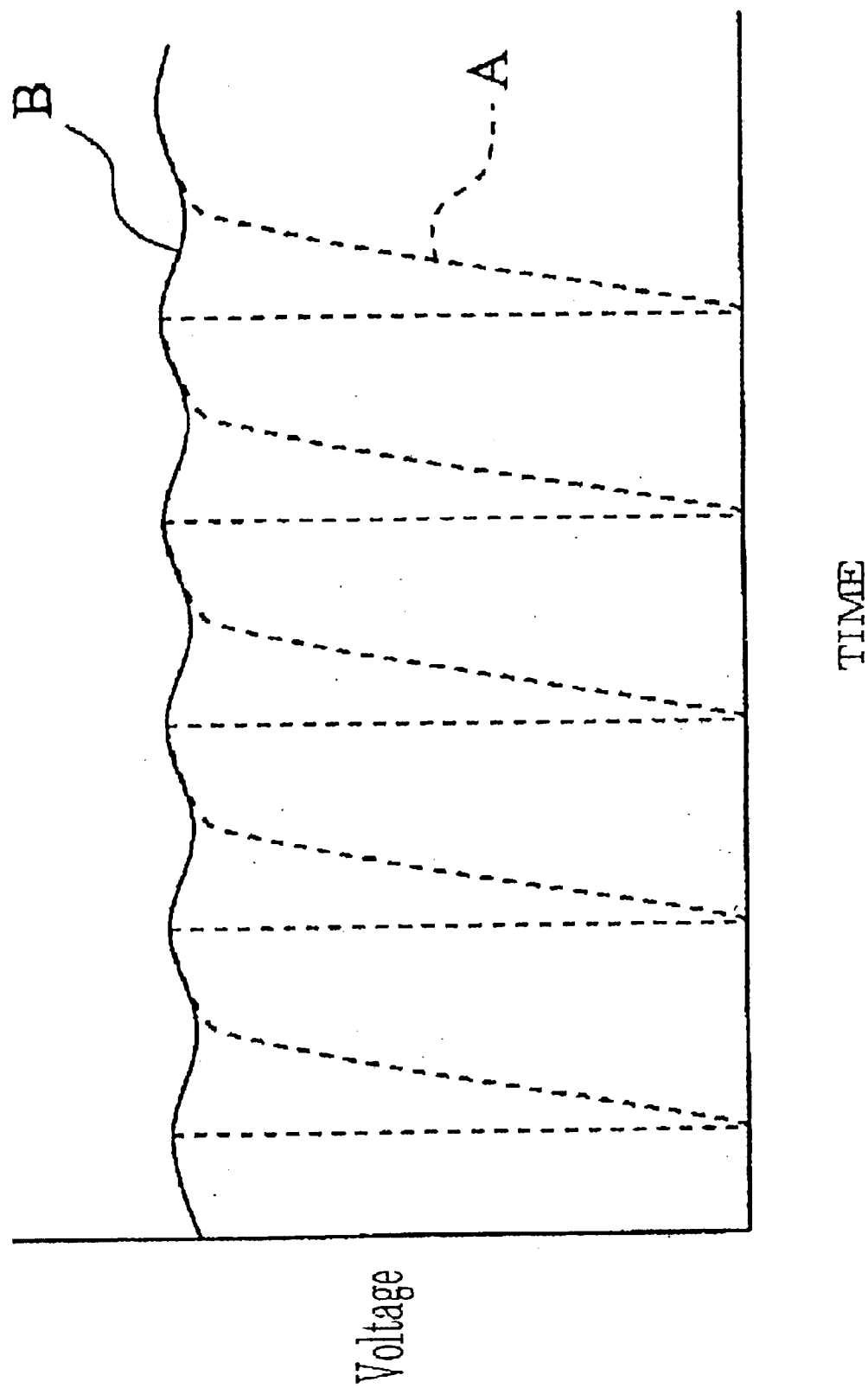
FIG. 7 is a view showing a voltage waveform for one or more of the exemplary embodiments of the present invention.

In this exemplary embodiment, the voltage waveform outputted from the main power supply circuit 22 is as shown by curve A in FIG. 7, and the voltage waveform for the discharge circuit 28 is as shown by curve B, also in FIG. 7.

The above exemplary configuration allows the current flowing in the capacitor 23 to be reduced and enables the supply of power to the control circuit 15, the injector and the ignition coil to be more stable.

In another exemplary embodiment, it is also possible to short circuit and open circuit the short circuiting circuit 27 using a microcomputer. Control of the short circuiting circuit 27 can thereby be improved by performing this control and the circuit itself can be simplified.

Figure 8:
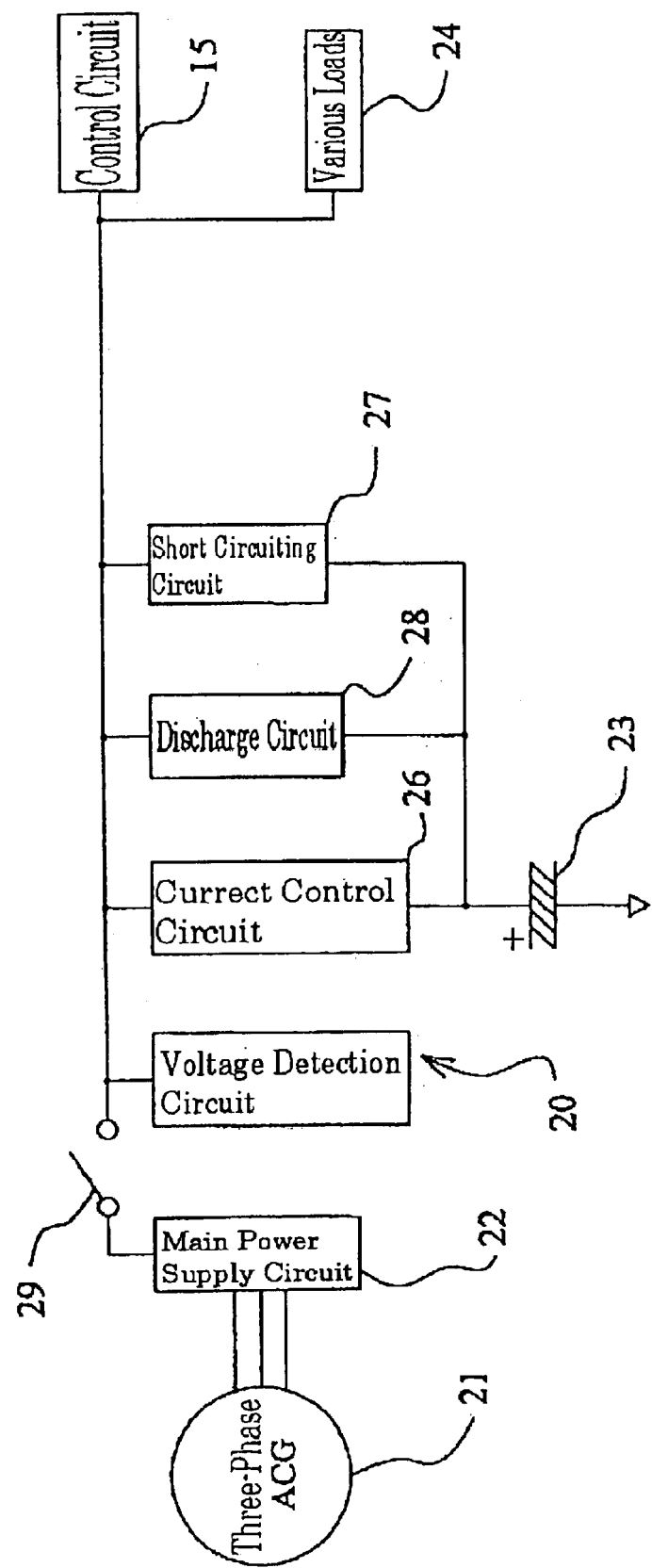
FIG. 8 is a circuit diagram showing another exemplary embodiment of the present invention.

In an exemplary embodiment, the main switch 29 is provided on the input side of the control circuit 15 but, as shown in FIG. 8, in another exemplary embodiment, it is also possible to provide the main switch 29 on the output side of the main power supply circuit 22.

In an exemplary embodiment, the circuitry of the power supply unit 16 and the control circuit 15 are incorporated into the ECU 15 and the main switch 29 is connected to the ECU 15 via a connector and the above embodiment therefore uses two power lines in order to connect the ECU 15 and the main switch 29. However, as shown in FIG. 8, the power lines can be reduced by providing the main switch 29 on the output side of the main power supply circuit 22 and arranging the main switch 29 midway along the power line connecting the main power supply circuit 22 and the other circuits.

According to the power supply unit for the internal combustion engine of the present invention described above, supply of drive power to the control circuit of the internal combustion engine can be stabilized, starting up of the control circuit is rapid and the internal combustion engine therefore starts in a rapid and reliable manner.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power stabilizing unit for supplying drive power to at least one control circuit for controlling an internal combustion engine and at least one other load, comprising:

a main power supply circuit for regulating drive power, a capacitor, connected to the main power supply circuit, for storing electrical power supplied by the main power supply circuit, a current control circuit for supplying electrical power, supplied by the main power supply circuit, to at least one of the at least one control circuit and said at least one other load but not to the capacitor when a voltage outputted by the main power supply circuit is less than a first set voltage, and supplying electrical power from the main power supply circuit to the capacitor when the voltage outputted by the main power supply circuit is greater than or equal to the first voltage, and a discharge circuit for supplying electrical power accumulated in the capacitor to said at least one control circuit and the other load when the output voltage of the main power supply circuit falls to a voltage equal to or less than the capacitor voltage.

2. The power stabilizing unit of claim 1 further comprising:

the short circuiting circuit including a switching element provided across said capacitor and said main power supply circuit such that said capacitor and said main power supply circuit are short-circuited by putting the switching element on when a voltage outputted from said main power supply circuit becomes greater than or equal to a second voltage.

3. The power stabilizing unit of claim 2, wherein the path of the short circuit is controlled by a microcomputer.

4. The power stabilizing unit of claim 2, wherein the switching element is a relay.

5. The power stabilizing unit of claim 2, wherein the switching element is an FET.

6. The power stabilizing unit of claim 2, wherein the switching element is capable of holding an on state using a self-holding function.

7. The power stabilizing unit of claim 6, wherein the switching element is capable of releasing the self-holding function by turning a main switch, used in starting and stopping the internal combustion engine, off.

8. The power stabilizing unit for an internal combustion engine of claim 1, further comprising:

a diode provided between said main power supply circuit and said voltage detection circuit, so that the at least one other load is connected between the diode and said main power supply circuit.

9. The power stabilizing unit of claim 1, further comprising:

a main switch, either connected at an input side of said at least one control circuit, or at an output side of said main power supply circuit.

10. The power stabilizing unit of claim 1, wherein said power stabilizing unit is part of a power supply unit, wherein said main power supply circuit is connected to a generator for generating electrical power.

11. The power stabilizing unit of claim 1, wherein said power stabilizing unit is part of a power supply unit, said power supply unit further including a generator for generating electrical power.

12. The power stabilizing unit of claim 1, wherein said power stabilizing unit is part of a power supply unit, which is further part of an internal combustion engine.

13. A power supply unit for supplying drive power to at least one control circuit for controlling an internal combustion engine and at least one other load, comprising:

a generator for generating electrical power, a main power supply circuit for regulating drive power, a capacitor, connected to the main power supply circuit, for storing electrical power supplied by the main power supply circuit, a current control circuit for supplying electrical power, supplied by the main power supply circuit, to at least one of the at least one control circuit and at least one other load but not to the capacitor when a voltage outputted by the main power supply circuit is less than a first set voltage, and supplying electrical power from the main power supply circuit to the capacitor when the voltage outputted by the main power supply circuit is greater than or equal to the first voltage, and a discharge circuit for supplying electrical power accumulated in the capacitor to said at least one control circuit and the other load when the output voltage of the main power supply circuit falls to a voltage equal to or less than the capacitor voltage.

14. An internal combustion engine, comprising:

a generator for generating electrical power, a main power supply circuit for regulating drive power, a capacitor, connected to the main power supply circuit, for storing electrical power supplied by the main power supply circuit, a current control circuit for supplying electrical power, supplied by the main power supply circuit, to at least one of at least one control circuit and at least one other load but not to the capacitor when a voltage outputted by the main power supply circuit is less than a first set voltage, and supplying electrical power from the main power supply circuit to the capacitor when the voltage outputted by the main power supply circuit is greater than or equal to the first voltage, and a discharge circuit for supplying electrical power accumulated in the capacitor to said at least one control circuit and the other load when the output voltage of the main power supply circuit falls to a voltage equal to or less than the capacitor voltage.

15. A power stabilizing unit for supplying drive power to at least one control circuit for controlling an internal combustion engine and at least one other load, comprising:

a main power supply circuit for regulating drive power, a capacitor, connected to the main power supply circuit, for storing electrical power supplied by the main power supply circuit, a current control circuit for supplying electrical power, supplied by the main power supply circuit, to the at least one control circuit and said other load when a voltage outputted by the main power supply circuit is less than a first set voltage, and supplying electrical power from the main power supply circuit to the capacitor when the voltage outputted by the main power supply circuit is greater than or equal to the first voltage, and a discharge circuit for supplying electrical power accumulated in the capacitor to said at least one control circuit and the other load when the output voltage of the main power supply circuit falls to a voltage equal to or less than the capacitor voltage, and a short circuiting circuit including a switching element provided across said capacitor and said main power supply circuit such that said capacitor and said main power supply circuit are short-circuited by putting the switching element on when a voltage outputted from said main power supply circuit becomes greater than or equal to a second voltage.

16. The power stabilizing unit of claim 15, wherein the path of the short circuit is controlled by a microcomputer.

17. The power stabilizing unit of claim 15, wherein the switching element is a relay.

18. The power stabilizing unit of claim 15, wherein the switching element is an FET.

19. The power stabilizing unit of claim 15, wherein the switching element is capable of holding an on state using a self-holding function.

20. The power stabilizing unit of claim 19, wherein the switching element is capable of releasing the self-holding function by turning a main switch, used in starting and stopping the internal combustion engine, off.

* * * * *